Aug. 22, 1939.                 C. B. GEORGE                    2,170,137
                          TRAIN CONTROL MECHANISM
                           Filed Dec. 7, 1936            2 Sheets-Sheet 1
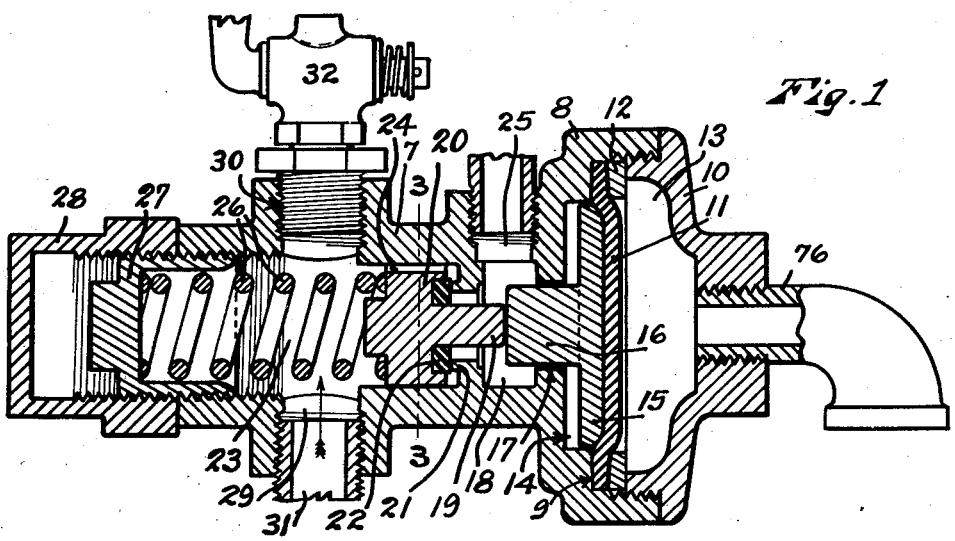
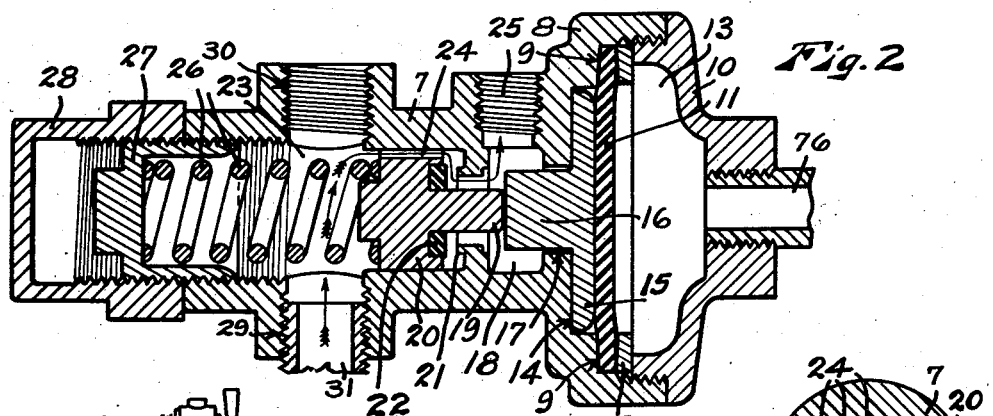
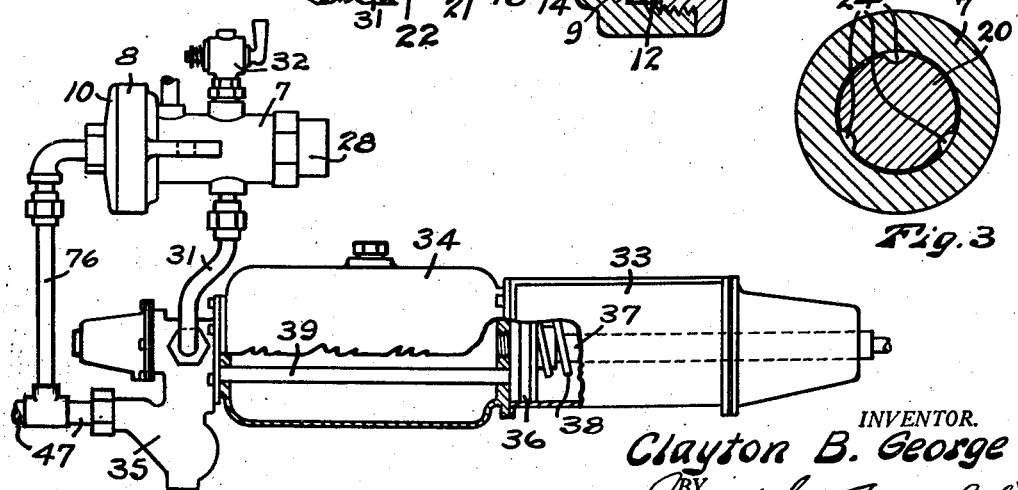
INVENTOR.
Clayton B. George
BY
ATTORNEY Aug. 22, 1939.　　　C. B. GEORGE　　　2,170,137
TRAIN CONTROL MECHANISM
Filed Dec. 7, 1936　　　2 Sheets-Sheet 2
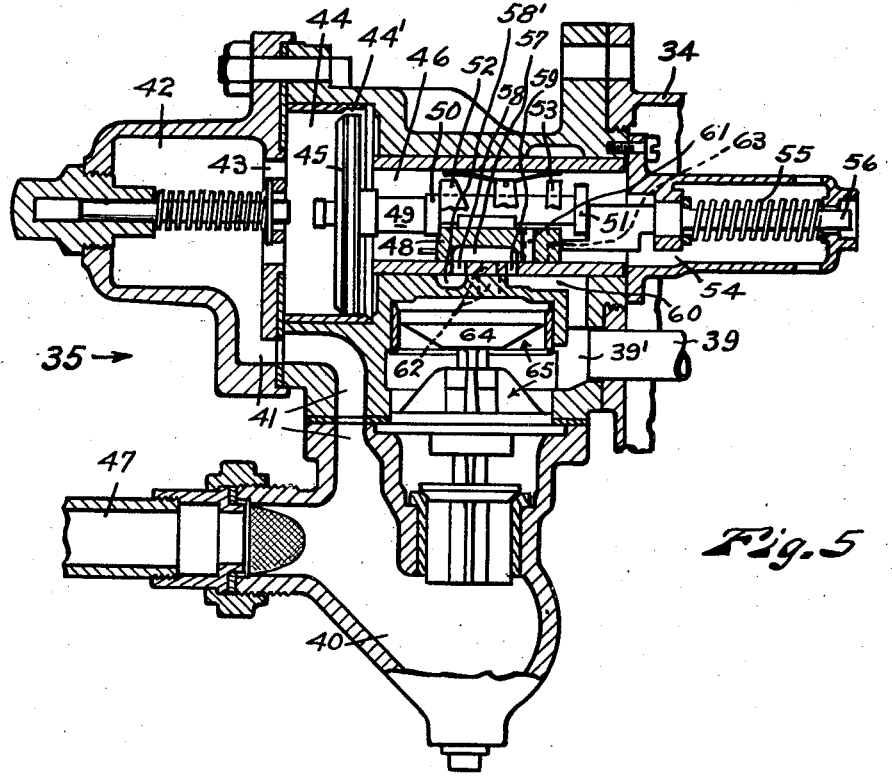
INVENTOR
Clayton B. George
BY
　　　　ATTORNEY Patented Aug. 22, 1939

2,170,137

UNITED STATES PATENT OFFICE 2,170,137

TRAIN CONTROL MECHANISM

Clayton B. George, Seattle, Wash., assignor to George Automatic Train Control Company, Seattle, Wash., a corporation of Washington Application December 7, 1936, Serial No. 114,667

5 Claims. (Cl. 303—77)

This invention relates to train control mechanism for use in connection with air brake means of the type commonly used on railway cars and the primary object of this invention is to provide train control mechanism for use in connection with an ordinary single air line air brake system which makes it possible to charge or build up the pressure in an auxiliary air reservoir and at the same time maintain the brakes in applied or set position.

Another primary object of this invention is to provide train control mechanism of this nature which is combined with ordinary air brake mechanism in such a manner as to make it possible to build up a pressure in an air brake cylinder substantially equal to the maximum pressure which can be built up in an auxiliary air reservoir that is connected with said air brake cylinder, this being accomplished by making it possible to retain the pressure in the air brake cylinder while the auxiliary reservoir is being recharged after a part of the pressure in the auxiliary reservoir has been transferred to the air brake cylinder, it being possible to recharge the auxiliary reservoir and admit air to the air brake cylinder a plurality of times until the pressure in the brake cylinder is very nearly equal to the maximum pressure which can be admitted to the auxiliary reservoir.

Another primary object of this invention is to provide train control means of this nature in which a valve governing the release of pressure from a brake cylinder is controlled by the pressure of air in a train line or brake pipe in such a manner that said valve may be opened very gradually, thereby making it possible to substantially eliminate the damaging effects due to the take up of slack between the several cars in a train.

Another object of this invention is to provide train control valve mechanism which is automatically controlled by the pressure in the brake pipe or train line of a railway air brake mechanism in such a manner as to make it possible for an engineer always to keep his auxiliary air reservoirs safely charged up with air under pressure and yet always to permit the engineer to release his brakes without objectionable time delay.

For purposes of illustration and clearness and definiteness of description, my invention will be set forth in conjunction with the brake mechanism commonly obtaining on freight cars but it is to be distinctly understood that it is applicable to the brake mechanism commonly obtaining on passenger cars, which for example, ordinarily have besides the auxiliary reservoir, other reservoirs commonly known as service and emergency reservoirs, respectively, but all being subject to train line pressure control, i. e., resembling in this feature the auxiliary reservoir.

In the operation of trains on long steep grades, a continuous (also referred to as "positive") or frequently repeated intermittent application of the air brakes is often required to keep the train under control and prevent runaways and wrecks with consequent loss or life, personal injury and property damage, as frequently happens with logging trains, exceedingly heavily loaded with large logs, on long mountain grades. The usual air brake equipment is not always adequate to meet the requirements of heavy trains on some of the longer and steeper grades, especially when it is not skillfully and efficiently handled by the engineer. If the brakes are applied continuously, the air pressure in the brake cylinder and auxiliary reservoir will gradually leak out until it is not sufficient to maintain the brakes efficiently in applied position, it being understood that while the brakes are applied the auxiliary reservoir is not permitted to recharge. The continuous application of the brakes for too long a period of time is often further objectionable because it tends to heat up the brake shoes and the car wheels. For these and other reasons it is common practice on long steep grades to apply and release the brakes intermittently, the brakes being applied long enough to check the speed of the train, then released for a short period of time and then applied again. This tends to rapidly reduce the air pressure in the auxiliary reservoirs due, first, to the fact that the air pressure in the brake cylinders exhausts to the atmosphere each time the brakes are released and, second, to the fact that the time between successive applications of the brakes is not sufficient to allow the auxiliary reservoirs to be fully recharged to their normal pressure. The result is that the pressure in the auxiliary reservoirs is lowered by each successive application and release of the brakes until it is not sufficient to apply the brakes with enough force to hold the train, and the train runs away. The time required for recharging the auxiliary reservoirs varies, depending on the number of cars in the train and the degree to which the auxiliary tanks are exhausted. From three to five minutes may be required to recharge the auxiliary tanks on an ordinary train of fifteen cars. The objectionable conditions hereinbefore described are especially liable to prevail on logging railroads but may be encountered wherever trains are operated on grades.

To overcome the shortcomings of the ordinary brake system as above described, there has been an attempt to remedy the same by providing what is known as a retainer valve which is applied to the exhaust port of the triple valve, whereby the air, when the exhaust port to the brake cylinder is opened, is arrested in its escape and therefore retains the brakes in applied position with gradually decreasing pressure due to leakage so long as any pressure remains in said cylinder, but of course with decreasing effectiveness. These valves are manually operated. On a very long train an operator starts out from each end of the train to move these valves on each car into closed position on the beginning of the descent. These valves operate to hold the brakes in applied position so that after they are once set, the setting is continued for a period until the pressure in the brake cylinders is exhausted. In the meantime, the engineer re-supplies the auxiliary reservoirs. The descent may involve several downgrades and with some upgrades or level stretches. When the descent for a particular grade is accomplished or an ascent or even a level stretch is made, the operators start out anew from each end of the train and move the said retainer valves into open position. Manifestly, any such practice is expensive, slow and cumbersome. During the total descent the said retainer valves must often be operated two or more times. This involves a loss of time and labor and is not satisfactory nor fully efficient.

To overcome such expensive, slow and cumbersome manual operation of the retainer valves on each individual brake cylinder of the train, independent air lines have been used to operate the retainer valve mechanism. Such separate and independent air lines to operate the retainer valve mechanism are objectionable in that they require extra and special equipment and require the maintenance of an extra air line. Beside the leakage problems involved in maintaining an extra air line and the expense of equipping cars for an extra air line a very serious difficulty obtains in that the breakage of such extra air line in the double air line systems heretofore occasionally used resulted in the opening of the retainer valve. In view of the fact that such opening of the retainer valves might occur during a time when they were most needed a very serious hazard to life and property inheres in the operation of such double air line system. Other prior art devices in attempting to use a single air line control of a retainer valve mechanism are seriously objectionable in that they do not provide for the direct control of the retainer valve mechanism by the engineer.

In accordance with my invention I provide a train control valve means which is directly connected with the train line or brake pipe by which air under pressure is supplied through the usual triple valve to the auxiliary air reservoir of the usual standard railway air brake equipment, and connect this control valve with the train line or brake pipe in such a manner as to make it possible to hold the brakes in applied or set position and at the same time charge or recharge the auxiliary reservoir. This makes it possible for the engineer always to keep his auxiliary air reservoirs safely charged up and does not require him to waste or lose any time in charging these auxiliary air reservoirs and does not require the provision of any additional air line in connection with standard air brake equipment.

The above mentioned general objects of my invention, together with others inherent in the same, are attained by the mechanism, illustrated in the following drawings, the same being preferred exemplary forms of embodiment of my invention, throughout which drawings like reference numerals indicate like parts:

Figure 1 is a longitudinal sectional view of a train control valve constructed in accordance with this invention showing the valve in closed position;

Fig. 2 is a similar view showing the valve in open position;

Fig. 3 is a cross section substantially on broken line 3—3 of Figure 1;

Fig. 4 is a view in elevation on a smaller scale than the preceding views, showing this train control valve installed in connection with a triple valve, an auxiliary air reservoir and a brake cylinder all of standard construction, parts of the auxiliary air reservoir and brake cylinder being broken away;

Fig. 5 is a detached sectional view of a standard type of triple valve with which my train control valve is connected; and Fig. 6 is a modified form of the invention showing in longitudinal section a train control valve.

The train control valve shown in Figs. 1 to 4 inclusive comprises a tubular housing 7, provided at one end with a portion 8 of larger diameter than the remainder of the housing. The larger portion 8 is internally recessed to provide an annular shoulder 9 and is internally threaded for the reception of an externally threaded internally recessed cap member 10. A flexible diaphragm 11, as of rubber, is positioned within the larger housing portion 8 with its circumferential portion resting against the shoulder 9. A washer 12 is positioned between the diaphragm 11 and the inner end of the cap member 10 to clamp the diaphragm against the shoulder 9 when the cap member is screwed tightly into the larger end portion 8 of the housing. Preferably the washer 12 and shoulder 9 are beveled or inclined, as shown, to facilitate the working of the diaphragm. The cap 10 has an internal recess 13 providing a pressure chamber on one side of the diaphragm 11. On the other side of the diaphragm a chamber 14 is formed in the valve housing for the reception of a disc or head 15 on a valve operating stem 16. The head 15 has a limited movement and provides a support and stop member for the diaphragm 11, preventing damage to said diaphragm by air pressure. The stem 16 extends through an axial guide 17 in the valve housing 10 into an exhaust chamber 18 where it is positioned to contact the end of another valve stem 19 on a valve member 20. A valve seat 21 is provided between the exhaust chamber 18 and the valve 20 for said valve 20 to seat against. The opening which is surrounded by the valve seat 21 is larger than the stem 19 allowing ample room for the passage of air therethrough. Preferably a gasket member 22 is provided on the face of the valve member 20 to engage the seat 21.

The valve member 20 is disposed within a chamber 23 by which it is guided and said valve member has longitudinal grooves 24, see Fig. 3, on the sides thereof to provide for the passage of air. The exhaust chamber 18 has one or more outlet openings 25.

A compression spring 26 presses against one side of the valve member 20 and urges said valve member toward the seat 21. The outer end of the spring 26 is supported within an externally threaded cup like member 27. The cup member 27 is threaded into the outer end of the housing 7 and may be adjusted to vary the compression of the spring 26. A cap 28 screws onto the cup like member 27 and abuts against the end of the housing 7, thereby serving as a cover for the cup 27 and a lock nut to hold said cup 27 in adjusted position. The abutting ends of the housing 7 and cap 28 are smoothly and accurately finished or ground so that when the cap 28 is jammed tightly against the housing 7 an air tight joint is formed to prevent leakage of air. A sealing compound may be introduced between these two surfaces to further insure an air tight connection at this location. Two internally threaded openings 29 and 30 are provided in the housing 7 communicating with the valve chamber 23. The opening 29 is connected with an air conduit pipe 31 which connects with the exhaust port of a triple valve and the opening 30 is closed preferably by a valve 32 which is connected therewith. When the valve 32 is closed it functions as a plug or closure means for the opening 30. When said valve 32 is open it permits the air to escape freely from the chamber 23.

In Fig. 4 I have shown my train control valve operatively connected with parts of a standard railway air brake mechanism. This air brake mechanism embodies an air brake cylinder 33, an auxiliary air reservoir 34 and a triple valve 35, all of the usual standard construction, and connected with each other in the usual manner. Within the air brake cylinder 33 is a piston 36 connected with a piston rod 37 by which brake mechanism, not shown, is operated. A spring 38 urges the piston 36 into retracted position. A pipe or air conduit 39 extends lengthwise through the auxiliary reservoir 34 and communicatively connects the brake cylinder 33 with a port 39' in the triple valve 35. This pipe 39 does not communicate with the interior of the auxiliary air reservoir 34.

The triple valve, Fig. 5, which is of well known standard construction, embodies a lower chamber 40 connected by a passageway 41 with an upper chamber 42. The chamber 42 is connected by passageways 43 with one end of a cylinder 44 within which a triple piston 45 is movably disposed. A slide valve chamber 46 is communicatively connected with the other end of the cylinder 44 by passageway 44'. An air pressure supply pipe 47, commonly called a "train line" or "brake pipe", is connected with the chamber 40 and supplies air from a source of supply, not shown, to the triple valve. This air is ordinarily under the control of the engineer in charge of the train. A slide valve 48 is operatively disposed within the slide valve chamber 46 and adapted to be moved slidably within said chamber 46 by a piston rod 49 which is connected with the slide valve and with the triple piston 45. Some lost motion is provided between the slide valve 48 and the piston rod 49, as by providing on the piston rod 49 two shoulder members 50 and 51 positioned to engage upwardly extending parts 52 and 53 respectively on the slide valve. The slide valve chamber 46 communicates through a chamber 54 with the auxiliary air reservoir 34. A spring 55 is provided on a retarding stem 56. One end of the retarding stem 56 engages the slide valve 48 and the spring 55 together with the pressure in the auxiliary reservoir 34 yieldingly urges the slide valve 48 and triple piston 45 into release position, as shown in Fig. 5.

The slide valve 48 is provided with an exhaust cavity 57 which is open on the bottom side of said slide valve and is adapted to connect two ports 58 and 59 when the slide valve is in the release position shown in Fig. 5. The port 58 connects with a port 58' which extends to the exterior of the triple valve and is communicatively connected with the pipe 31 which connects with the chamber 23 of the train control valve. The port 59 is connected by a passageway 60 with the conduit 39' which communicates with the brake cylinder.

A vertical service port or passageway 61 is provided in the slide valve 48. In Fig. 5 the slide valve is shown in the release or exhaust position with the exhaust cavity 57 connecting ports 58 and 59. If said slide valve is moved to the left from the position shown in Fig. 5 to a service position, the exhaust cavity will be out of registration as respects port 59 and the service port 61 in the slide valve will be in registration with the port 59. This cuts off communication between the brake cylinder and the exhaust port 58 and connects the brake cylinder and auxiliary reservoir 34 so that air pressure from the auxiliary reservoir 34 is admitted to the brake cylinder to apply the brakes. Service port 61 may only partially register with port 59 in a quick service position or it may fully register with port 59 in a full service position.

An emergency port 62 is also provided in the slide valve seat and a cut away portion 63 is provided in the slide valve in a position to register with the port 62 in case of an emergency application of the brakes. Port 62 and cut away portion 63 are shown by broken lines in Fig. 5 as they are not in the same vertical plane as ports 58 and 59. In case an emergency application of the brakes is made by a very rapid reduction in pressure on the outer face of triple piston 45 the slide valve 48 will be momentarily moved to the left past the full service position and cut away portion 63 will register with port 62, thus providing a quick rise in pressure in a chamber 64 above emergency valve mechanism, designated generally by 65. This operates said emergency valve mechanism to admit an initial charge of air under pressure directly from the train line into the brake cylinder. The operation of this emergency mechanism makes it possible to build up a higher pressure in the brake cylinder than it would be possible to build up by establishing communication of the brake cylinder with the auxiliary reservoir only.

As this emergency mechanism is standard equipment and well known in the art, it is only generally illustrated and described to complete this showing.

Other ports and passageways are also provided in the slide valve 48, but as these are not pertinent to this invention, they are not herein described.

In Fig. 6 I have shown a modified form of train control valve. In this figure the parts 9 to 21, inclusive, in so far as they are shown, are substantially identical with the corresponding parts in Figs. 1 and 2, and are correspondingly numbered. The chamber 23', which corresponds to chamber 23 of Figs. 1 and 2, is larger than said chamber 23 and is provided with openings 66 and 67 corresponding to the openings 29 and 30 of Figs. 1 and 2. To provide for a better seal against leakage of air from chamber 23' than is provided in the device of Figs. 1 and 2, I provide a diaphragm 68 positioned to bear against the end of a valve member 20' which corresponds to the valve member 20. The circumferential portion of the diaphragm 68 is securely held between a shoulder 69 of the valve housing and the end portion of a fitting 70 which is secured to the valve housing. A stem 71 is provided with a head 72 which presses against the side of the diaphragm 68 opposite to the piston 20'. A compression spring 73 is provided on the stem 71 and is compressed between the head 72 and a screw member 74 which is threaded into the outer end of the fitting 70. A handle 75 is secured to the outer end of the screw member 74 to provide for quick and easy adjustment of the compression of spring 73 by turning screw member 74.

The train control valve shown in Fig. 6 is adapted to be connected with a triple valve in the same manner as the train control valve shown in Figs. 1 to 4, and operates in substantially the same manner as the train control valve shown in Figs. 1 to 4. The diaphragm 68 precludes substantially all possibility of leakage of air and makes it possible to dispense with the nut member 28 shown in Figs. 1 and 2 and to provide a handle directly on the member 74.

In the installation of a train control valve of this type the chamber 23 of the train control valve of Figs. 1 to 4 is connected by the air conduit pipe 31 with the exhaust port 58 of the triple valve. The chamber 13 of this train control valve is connected by conduit means 76 preferably with the train line or brake pipe 47 through which air is supplied to the triple valve. When a normal train line pressure is maintained within the train line 47, this pressure, which is also present in triple valve cylinder 44, will maintain the slide valve 48 in the released position, permitting air from the brake cylinders to exhaust through pipe 39, passageway 60, port 59, cavity 57 of slide valve 48, port 58 and pipe 31 to chamber 23. If at this time the pressure in train line 47 is sufficient to provide a pressure in chamber 13, great enough to overcome the force of spring 26 and open valve 20, then the air reaching chamber 23 will exhaust past valve 20 through chamber 18 and out through exhaust port or opening 25. If this train line pressure is not sufficient to open valve 20 in the train control valve, then the pressure in the brake cylinder cannot exhaust to the atmosphere but the triple piston 45 will be held in the release position shown in Fig. 5 and will maintain a feed groove 44' in the cylinder 44 open, thus permitting the auxiliary reservoir to charge up to a pressure equal to the train line pressure while the pressure in the brake cylinder is maintained because it cannot escape past the valve 24. This makes it possible to hold the pressure in the brake cylinder, thereby holding the brakes in applied position, and at the same time to charge or build up the pressure in the auxiliary reservoir. This cannot be accomplished in the ordinary air brake system without the use of some form of auxiliary valve.

In the usual air brake system a predetermined pressure is maintained in the auxiliary reservoir. The brakes are applied by communicatively connecting the auxiliary reservoir with the brake cylinder. This makes it possible to provide a pressure in the brake cylinder of only as much as can be obtained by equalizing the pressure in the auxiliary reservoir and brake cylinder. As an instance, if a pressure of 70 pounds per square inch is carried in the auxiliary reservoir, which is usually of larger capacity than the brake cylinder, it has been found possible in practice by equalizing the pressure in the brake cylinder and the auxiliary reservoir to provide a maximum pressure of approximately 50 pounds in the brake cylinder. By the use of my control valve it is possible to first obtain this same equalization of pressures, giving a pressure of 50 pounds in the brake cylinder and then while this pressure of 50 pounds is retained in the brake cylinder, to recharge the auxiliary reservoir to the maximum pressure, and again equalize the pressure in the auxiliary reservoir and brake cylinder. This recharging of the auxiliary reservoir and equalizing of pressures may be repeated several times—thus making it possible to build up a pressure in the brake cylinder which is very nearly equal to the pressure in the auxiliary reservoir.

As the opening of the valve member 20 in the train control valve is governed by the pressure in chamber 13, which in turn is controlled by the train line pressure 47, it is possible, by the proper control of the train line pressure, to open the valve 20 very slowly and easily. This provides for releasing the pressure in the brake cylinders very slowly after the brakes of a train have been applied. This slow and easy release of the brakes obtained by the use of this train control valve makes it possible to so control the take up of slack between the several cars of the train as to avoid substantially all of the damaging effects common to the take-up of such slack.

When the brakes of a train are in released position, the triple valve parts will be in substantially the positions shown in Fig. 5. When the brakes are to be set, the engineer reduces or releases the pressure in the train line or brake service pipe 47 which is connected with the triple valve 35. This reduces the train line pressure against the outer side of the triple piston 45, and permits the auxiliary reservoir pressure in slide valve chamber 46 to move the triple piston 45 and slide valve 48 to the left. This movement closes the port 59 to exhaust and opens the same to communication with the auxiliary air reservoir by reason of the registration or partial registration of ports 59 and 61, admitting air under pressure from the auxiliary reservoir to the brake cylinder and applying the brakes. As long as the pressure in the train line or brake service pipe 47 is less than the pressure in the auxiliary reservoir the brakes will remain set, but their effectiveness may be gradually reduced by leakage of air. As long as the slide valve 48 remains in the service position it is impossible to recharge the auxiliary air reservoir. In the usual standard air brake apparatus the slide valve can not be returned to release or charging position without releasing the brakes. The use of my train control valve makes it possible for an engineer to recharge the auxiliary reservoirs without releasing the brakes or to release the brakes before the auxiliary reservoirs are recharged. This provides the safety feature of making it possible to hold the brakes set while the auxiliary reservoirs are being recharged but does not oblige an engineer to follow this course where the interests of safety do not demand it and where he can save valuable time by not waiting to recharge the auxiliary reservoirs.

To release the brakes and recharge the auxiliary reservoirs, pressure is admitted to the pressure supply brake pipe 47. This moves the slide valve to charging position changing the connection as follows: Communication between the pipe 39 and the auxiliary reservoir 34 is shut off and the pipe 39 is connected through passageway 60, port 59, cavity 57 and port 58, with the exhaust passageway 58' of the triple valve, allowing the pressure in the brake cylinder to exhaust. At the same time communication is established between the train line or air pressure supply brake pipe 47 and the auxiliary reservoir 34, allowing the auxiliary reservoir to be recharged to the required pressure. It is now common practice to allow the compressed air from the brake cylinder to exhaust through the triple valve directly to the atmosphere, thus fully releasing the brakes before the auxiliary reservoir has had time to become safely charged. With such apparatus, when the brakes are applied or set a plurality of times in rapid succession the auxiliary reservoir pressure may be reduced to such an extent that it will not apply the brakes with sufficient force to hold a train, the results often being run-away trains and wrecks. When my train control valve is applied in the manner shown in Fig. 4 and hereinbefore described, it is possible for the engineer to always keep his auxiliary reservoirs fully charged when operating on steep grades or on dangerous roadbeds and at the same time the release of the brakes is always fully and completely under the control of the engineer.

The pressure in the train line pipe 47 is under the control of the engineer. If this pressure is less than enough to overcome the compression of the spring 26 then this train control valve remains closed and operates as an automatic continuous retainer which will prevent the exhaust of pressure from the brake cylinders as long as the low brake service pipe pressure is maintained.

Owing to inequalities in construction and adjustment and to wear, it is often found, in a train of cars, that some of the brake pistons 36 will need to be moved farther than others to apply the brakes with a desired force. Due to this difference it is found that if the pressure in all of the auxiliary reservoirs and corresponding brake cylinders have been equalized in applying the brakes, said brakes will be applied with unequal force, the brakes on the cars having the shorter piston travel being applied with more force than the brakes on the cars having the longer piston travel. By using my train control valves to continuously retain the pressure in all of the brake cylinders of the train and several times recharging the auxiliary reservoirs and equalizing the auxiliary reservoir and brake cylinder pressure, it is possible to build up a pressure which is very nearly equal in all of said brake cylinders of a train, irrespective of variations in the distance of piston travel in the brake cylinders of different cars. This overcomes the tendency of some cars to exert a greater drag than other cars when the brakes of a train are set.

I have disclosed my train control valve as being a separate unit adapted for connection with a standard type of triple valve and brake pipe but it will be understood that the same may be incorporated into the construction of the triple valve if desired without departing from the spirit of this invention.

Obviously, changes may be made in the forms, dimensions, and arrangement of the parts of my invention, without departing from the principle thereof, the above setting forth only preferred forms of embodiment.

I claim:

1. The combination with an air brake mechanism, embodying a brake cylinder, an auxiliary reservoir, a triple valve operatively connected with said brake cylinder and said auxiliary reservoir controlling the inlet of air to and the outlet of air from said brake cylinder and said auxiliary reservoir, said triple valve having an exhaust passageway, and air pressure supply brake pipe means connected with said triple valve; of a train control valve housing; a flat valve seat of ring form disposed in said valve housing at right angles to its axis; a valve having a seat registrable with said valve housing closable on said seat; a flexible diaphragm operatively disposed in said housing forming an air-tight partition rearwardly of said valve; a spring means bearing against said diaphragm and urging said valve closed with a pressure greater than the pressure in the auxiliary reservoir when said reservoir has its minimum standard charge urging said valve closed; spring pressure adjusting means connected with said spring; pressure chamber means in one end portion of said housing; conduit means communicatively connecting said pressure chamber means with said air pressure supply brake pipe means; a flexible diaphragm in said pressure chamber operatively connected with said valve and movable to open said valve in response to an increase of pressure in said pressure chamber; an exhaust port communicating with said valve housing between said valve seat and said diaphragm; and conduit means connecting the exhaust passageway of said triple valve with said train control valve housing, said valve seat being positioned between said exhaust port and the point of connection of said conduit means.

2. The combination with an air brake mechanism, embodying a brake cylinder, an auxiliary reservoir, a triple valve operatively connected with said brake cylinder and said auxiliary reservoir controlling the inlet of air to and the outlet of air from said brake cylinder and said auxiliary reservoir, said triple valve having an exhaust passageway, and air pressure supply brake pipe means connected with said triple valve; of a train control valve housing; an inlet port communicating with the triple valve exhaust; an atmosphere exhaust port in said valve housing a valve seat of the ring type in said valve housing disposed between said inlet and exhaust ports; a valve characterized by having (a) a sleeve and a longitudinally sliding guide therein and a plurality of symmetrically positioned air passageways between the guide and the sleeve, (b) a valve face positioned on the sliding guide and lying in a plane at right angles to the longitudinal movement of said sliding guide, (c) a valve seat operatively positioned as respects said valve face, and (d) an enlarged head providing a piston face mounted on said sliding guide; a flexible diaphragm operatively disposed in said housing forming an air-tight partition back of said inlet port and bearing upon said enlarged head of said valve, whereby the exhaust pressure from said triple valve assists in opening said valve; a spring mounting means bearing against said diaphragm on the side opposite from said valve; a spring on said mounting means urging said valve closed with a pressure greater than the pressure in the auxiliary reservoir when said reservoir upon being charged is provided with its minimum charge; spring pressure adjusting means connected with said spring; an air pressure chamber in one end portion of said housing; a second flexible diaphragm operatively disposed in said housing and in said pressure chamber, forming an air-tight partition forwardly of said valve seat and bearing against one end of said piston type valve, whereby said valve may be unseated when air pressure against said diaphragm is greater than the opposing pressure; and conduit means communicatively connecting said pressure chamber with the air pressure supply brake pipe means.

3. The method of controlling the air brake mechanism in a system having a train air line, an auxiliary reservoir, a brake cylinder, a triple valve and a train control means, comprising the steps of subjecting the exhausting air from the triple valve to control by differential pressure in the train air line, and subjecting the exhaust from the triple valve to augment the train line pressure.

4. The combination with an air brake mechanism, embodying a brake cylinder, an auxiliary reservoir, a triple valve operatively connected with said brake cylinder and with said auxiliary reservoir controlling the inlet of air to and the outlet of air from said brake cylinder and said auxiliary reservoir, said triple valve having an exhaust passageway, an air pressure supply brake pipe means connected with said triple valve; of a train control valve housing member; an inlet port in said housing member communicating with said triple valve exhaust; a discharge port in said housing member; a sleeve member in said housing member operatively positioned between said inlet port and said discharge port, a piston like longitudinally sliding and relatively short guide in said sleeve member; a valve face positioned on the sliding guide and lying in a plane at right angles to the longitudinal movement of said sliding guide; a valve seat operatively positioned as respects said valve face; an adjustable spring member operatively positioned to bear directly against said guide and urge said valve face into valve seating position relative to said valve seat; a relatively short member engageable with said guide and movable in a longitudinal plane to unseat said valve face relative to said valve seat, said member provided with an enlarged head member at an end opposite to that engaging the said guide; a flexible diaphragm forming one wall of a chamber in said train control valve housing, said diaphragm being operatively positioned adjacent to said enlarged head member; and an inlet port in said chamber adapted to be connected to the air pressure supply brake pipe means, whereby the pressure in said air pressure supply brake pipe means may move said diaphragm and said head and in turn the said sliding guide and unseat said sliding guide face from said valve seat and air from the exhaust of the triple valve will be released past the valve face and valve seat.

5. The combination with an air brake mechanism, embodying a brake cylinder, an auxiliary reservoir, a triple valve operatively connected with said brake cylinder and said auxiliary reservoir controlling the inlet of air to and the outlet of air from said brake cylinder and said auxiliary reservoir, said triple valve having an exhaust passageway, and air pressure supply brake pipe means connected with said triple valve; of a train control valve housing; an inlet port in said housing communicating with the triple valve exhaust; an atmosphere exhaust port in said housing; a valve seat in said valve housing disposed between said inlet and exhaust ports; a valve member closable on said seat; a flexible diaphragm operatively disposed in said housing forming an air tight partition back of said inlet port and operatively connected to said valve member, whereby the exhaust pressure from said triple valve assists in opening said valve; a spring mounting means bearing against said diaphragm on the side opposite from said valve member; a spring on said mounting means urging said valve member closed upon said seat with a pressure greater than the pressure in the auxiliary reservoir when said reservoir upon being charged is provided with its minimum charge; an air pressure chamber in one end portion of said housing; a second flexible diaphragm operatively disposed in said housing and in said pressure chamber, forming an air tight partition forwardly of said valve seat and bearing against one end of said valve member, whereby said valve may be unseated when air pressure against said diaphragm is greater than the opposing pressure; and conduit means communicatively connecting said pressure chamber with the air pressure supply brake pipe means.

CLAYTON B. GEORGE.